(12) United States Patent
Ben-Arie (10) Patent No.: US 10,602,807 B2
(45) Date of Patent: *Mar. 31, 2020

(54) BELT RATCHETING DEVICE

(71) Applicant: Jezekiel Ben-Arie, Carlsbad, CA (US)

(72) Inventor: Jezekiel Ben-Arie, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/297,655

(22) Filed: Mar. 9, 2019

(65) Prior Publication Data

US 2019/0200710 A1 Jul. 4, 2019

Related U.S. Application Data (63) Continuation-in-part of application No. 15/722,755, filed on Oct. 2, 2017, now Pat. No. 10,390,590, and
(Continued)

(51) Int. Cl.
| | |
|---|---|
| *A44B 11/12* | (2006.01) |
| *A41F 9/00* | (2006.01) |
| *F16G 11/10* | (2006.01) |
| *A43C 7/04* | (2006.01) |
| *A43C 7/08* | (2006.01) |
| *A43C 11/20* | (2006.01) |
| *A43C 11/14* | (2006.01) |
| *A43C 1/00* | (2006.01) |

(52) U.S. Cl.
CPC .............. *A44B 11/12* (2013.01); *A41F 9/002* (2013.01); *A43C 7/04* (2013.01); *A43C 7/08* (2013.01); *A43C 11/14* (2013.01); *A43C 11/20* (2013.01); *F16G 11/105* (2013.01); *A43C 1/00* (2013.01)

(58) Field of Classification Search
CPC ......... A41F 9/002; A43C 11/14; A43C 11/20; A43C 1/00; A43C 7/00; A43C 7/04; A43C 7/08; A44B 11/12; F16G 11/105
See application file for complete search history.

(56) References Cited

U.S. PATENT DOCUMENTS 1,279,043 A * 9/1918 Treadgold ................ A43C 7/04
24/712.6
1,489,117 A * 4/1924 De Paye .................. A43C 7/00
24/712.6
(Continued)

FOREIGN PATENT DOCUMENTS

DE  3344489 A1  12/1983

*Primary Examiner* — Robert Sandy
*Assistant Examiner* — David M Upchurch (57) ABSTRACT

The Belt Ratcheting Device (BRD) facilitates unidirectional belt fastening and fast release. The BRD has a turning gate rotatably installed diagonally in a channel. The turning gate has a tapered front end with sharp edge with a smooth side. A preloaded spring keeps the BRD in active state when the release lever is not pulled. The BRD has two states: "active" and "inactive". In the active state the device works as a belt ratchet i.e. allowing the belt to be pulled forwards but restricting any belt motion backwards. After fastening, the belt remains fastened until the BRD is switched into inactive state by manually pulling the lever. The BRD doesn't employ serrated surfaces, which cause accelerated belt wear. Instead, the BRD's smooth side and channel's smooth surfaces minimize belt wear. BRDs facilitate garment belt fastening or belt fastening of footwear.

11 Claims, 7 Drawing Sheets

Related U.S. Application Data a continuation-in-part of application No. 15/207,517, filed on Jul. 12, 2016, now Pat. No. 9,808,050.

(60) Provisional application No. 62/672,066, filed on May 16, 2018.

(56) References Cited

U.S. PATENT DOCUMENTS

| | | | | |
|---|---|---|---|---|
| 2,131,454 | A * | 9/1938 | Prestinari | A44C 5/185 24/265 R |
| 3,225,402 | A * | 12/1965 | Altman | A43C 7/04 24/712.6 |
| 4,071,964 | A | 2/1978 | Vogiatzis | |
| 4,125,918 | A | 11/1978 | Baumann | |
| 4,130,949 | A | 12/1978 | Seidel | |
| 4,261,081 | A | 4/1981 | Lott | |
| 4,458,373 | A | 7/1984 | Maslow | |
| 4,507,878 | A | 4/1985 | Semouha | |
| 4,616,432 | A | 10/1986 | Bunch | |
| 4,648,159 | A | 3/1987 | Dougherty | |
| 4,991,273 | A | 2/1991 | Huttle | |
| 5,001,847 | A | 3/1991 | Waters | |
| 5,097,573 | A | 3/1992 | Gimeno | |
| 5,109,581 | A | 5/1992 | Gould | |
| 5,119,539 | A | 6/1992 | Curry | |
| 5,177,882 | A | 1/1993 | Berger | |
| 5,203,053 | A | 4/1993 | Rudd | |
| 5,230,171 | A | 7/1993 | Cardaropoli | |
| 5,293,669 | A | 3/1994 | Sampson | |
| 5,293,675 | A | 3/1994 | Shai | |
| 5,295,315 | A | 3/1994 | Osawa | |
| 5,335,401 | A | 8/1994 | Hanson | |
| 5,467,511 | A | 11/1995 | Kubo | |
| 5,477,593 | A | 12/1995 | Leick | |
| 5,572,774 | A | 11/1996 | Duran | |
| 5,572,777 | A | 11/1996 | Shelton | |
| 5,588,186 | A | 12/1996 | Ko | |
| 5,647,824 | A | 7/1997 | Levenson | |
| 6,049,950 | A * | 4/2000 | Cavallo | F16G 11/101 24/170 |
| 6,076,241 | A | 6/2000 | Borel | |
| 6,094,787 | A | 8/2000 | Chang | |
| 6,192,241 | B1 | 2/2001 | Yu | |
| 6,192,559 | B1 | 2/2001 | Munsell | |
| 6,282,817 | B1 | 9/2001 | Curet | |
| 6,334,240 | B1 | 1/2002 | Li | |
| 6,339,867 | B1 | 1/2002 | Azam | |
| 6,438,871 | B1 | 8/2002 | Culverwell | |
| 6,588,079 | B1 | 7/2003 | Manzano | |
| 6,622,358 | B1 | 9/2003 | Christy | |
| 6,729,000 | B1 * | 5/2004 | Liu | A43C 3/04 24/132 WL |
| 6,735,829 | B2 | 5/2004 | Hsu | |
| 6,938,308 | B2 | 9/2005 | Funk | |
| 7,082,701 | B2 | 8/2006 | Dalgaard | |
| 7,100,901 | B2 | 9/2006 | Gleinser | |
| 7,152,285 | B2 | 12/2006 | Liao | |
| 7,313,849 | B2 | 1/2008 | Liu | |
| 7,320,161 | B2 | 1/2008 | Taylor | |
| 7,360,282 | B2 | 4/2008 | Borsoi | |
| 7,591,050 | B2 | 9/2009 | Hammerslag | |
| 7,681,289 | B2 | 3/2010 | Liu | |
| 8,046,937 | B2 | 11/2011 | Beers | |
| 8,141,273 | B2 * | 3/2012 | Stramare | A43C 7/08 24/134 P |
| 8,230,560 | B2 | 7/2012 | Luzlbauer | |
| 8,231,074 | B2 | 7/2012 | Hu | |
| 8,332,994 | B2 | 12/2012 | Lin | |
| 8,371,004 | B2 | 2/2013 | Huber | |
| 8,381,362 | B2 | 2/2013 | Hammerslag | |
| 9,185,948 | B2 | 11/2015 | Ben-Arie | |
| 2002/0002781 | A1 | 1/2002 | Bouirer | |
| 2003/0070269 | A1 * | 4/2003 | Chung | A43C 3/00 24/714.6 |
| 2003/0226284 | A1 | 12/2003 | Grande | |
| 2004/0148741 | A1 * | 8/2004 | Hsiao | A43C 11/1406 24/68 SK |
| 2004/0226189 | A1 * | 11/2004 | Semitka | A43C 3/00 36/50.5 |
| 2005/0005477 | A1 | 1/2005 | Borsoi | |
| 2006/0213085 | A1 | 9/2006 | Azam | |
| 2007/0169380 | A1 | 7/2007 | Borsoi | |
| 2008/0250618 | A1 | 10/2008 | Stramare | |
| 2009/0172929 | A1 | 7/2009 | Hwang | |
| 2010/0115744 | A1 | 5/2010 | Fong | |
| 2011/0067211 | A1 * | 3/2011 | Huber | A43B 5/0401 24/712.1 |
| 2011/0094072 | A1 * | 4/2011 | Lin | A43C 1/00 24/712.6 |
| 2013/0160256 | A1 * | 6/2013 | Waldman | A43C 7/04 24/712.6 |
| 2014/0208551 | A1 * | 7/2014 | Ben-Arie | A43C 7/04 24/712.9 |
| 2015/0113770 | A1 | 4/2015 | Laatz | |
| 2015/0216264 | A1 * | 8/2015 | Kim | A43C 7/00 24/712.7 |
| 2016/0374432 | A1 * | 12/2016 | Park | A43C 7/00 24/324 |

* cited by examiner

BELT RATCHETING DEVICE

CROSS-REFERENCE TO RELATED APPLICATIONS

This Application is Continuation In Part of application Ser. No. 15/722,755 Filed on Oct. 2, 2017 (which is Continuation in Part of U.S. Pat. No. 9,808,050 Filed on: Jul. 12, 2016). In addition, this application claims the priority of Provisional Patent Applications:

Ser. No. 62/672,066, Filed: May 16, 2018.

Ser. No. 62/252,511, Filed: Nov. 8, 2015 (via Continuation In Part of U.S. Pat. No. 9,808,050 Filed on: Jul. 12, 2016).

FEDERALLY SPONSORED RESEARCH

Not Applicable

SEQUENCE LISTING OR PROGRAM

Not Applicable

FIELD OF THE INVENTION

The invention is related to devices for fastening and keeping fastened belts, bands, straps, ribbons, waist belts, suspenders, sandals, brassieres, watch bands, garment belts strips, laces chords, ropes, strings and alike.

BACKGROUND OF THE INVENTION—PRIOR ART

Several inventions were concerned with ratchet mechanisms configured for fastening waist belts. In U.S. Pat. No. 5,588,186A Soon-Myung Ko filed in 1995 May 26 a patent which teaches a belt with improved ratchet type buckling means. The ratcheting mechanism was constructed by a toothed belt and a releasable pawl in the buckle. In Application US20150113770A1 filed on 2014 Mar. 18 Robin LaatzKore taught a ratchet belt system which comprised a belt with a notch strip which extends along a portion of the length of the belt. The notch strip is formed of a plurality of adjacent notches, each being configured to engage a ratcheting pawl in the buckle. In principle, the notch strip is very similar to the toothed belt. Another invention which teaches a similar structured ratchet mechanism is presented by Jong Lee in application filed on 2004 May 7. The structure of toothed belt and similarly a notch strip belt is expensive to manufacture and is susceptible to accelerated wear since the belt is made of soft material. Furthermore, the ratchet pawl applies a strong shear force which equals to the total fastening force just on one tooth of the toothed belt. This shear force plays a major role in the belt's accelerated wear. In addition, the toothed structure is configured to provide fastening stations only at discrete locations along the belt. In contrast, our invention does not suffer from these drawbacks.

Another prevalent approach for belt ratcheting is based on a ratchet wheel which rotates while mechanically linked to a cylinder with rough surface which compresses and fastens the belt. Such are the invention of Smetz-Rud Ketten et al. in patent application DE3344489A1 filed on 1983 Dec. 6. Also in U.S. Pat. No. 5,647,824A filed on 1995 Oct. 25, Levenson teaches a Weight lifter's belt incorporating strap fastened by a ratchet wheel. In U.S. Pat. No. 7,100,901B2 filed on 2001 Jun. 28 Gerhard Gleinser taught a Tension ratchet with a belt magazine also utilizing a ratchet wheel mechanism. Ratchet wheel mechanism is utilized in many other belt fastening inventions.

Many devices were invented for shoe lace tightening. The most commercially successful is U.S. Pat. No. 6,339,867 by Azam which is widely used in fastening laces of skiing and skates boots. The tightening principle is a spring loaded gear wheel which can move in wedge shaped passage which widens forwards and narrows backwards. The laces pass through that passage and can be fastened by pulling the laces forwards which in turn pulls forwards the gear wheel towards the wider part of the passage where the laces are free to move. When the pulling stops the laces pull the gear wheel backwards, which narrows the passage and blocks the laces' backwards motion. The laces can be released by pulling the gearwheel forwards with a knob. There are few noticeable disadvantages to this popular invention. The device must be installed on heavy-solid footwear which eliminates its use with regular shoes and the user must constantly pull the knob to keep the releasing. In addition, the teeth of gearwheel and opposite teeth cause severe lace wear. Similar approach is taken in U.S. Pat. No. 7,360,282 by Borsoi and in U.S. Pat. No. 8,141,273 by Stramare. The lace buckle device described in U.S. Pat. No. 6,334,240 by Li is used widely in coat laces. It has a lace passage controlled by a spring loaded piston that blocks lace motion when the spring is released. Except for the similar name there is no similarity to our invention. This buckle controls only one lace and does not have a ratchet operation at all. When the user wants to release or fasten the lace the user has to press the spring loaded piston, release the lace and pull at the same time. When the spring is released, the buckle returns to b the lace. Similar devices are sold as "shoe buckles" for fastening shoe laces. The main disadvantage of such shoe buckles is that they do not have a ratcheting operation, which enables one to fasten the laces just by pulling. The shoe buckles require one to fasten the laces with one hand while keeping the buckle in open position with the other hand and then switching the buckle into locked position. This results in cumbersome and inefficient fastening.

In U.S. Pat. No. 6,729,000 Liu uses for lace tightening a teethed rotating bar. In U.S. Pat. No. 6,076,241 by Borel and in several others such as in U.S. Pat. No. 6,622,358 to Christy and in U.S. Pat. No. 6,192,241 by Yu et al. use fastening devices which are based on pipes or channels which have diagonal teeth to block reverse motion of the lace. The pipes are installed on the shoes in different locations.

In U.S. Pat. No. 8,371,004 Huber teaches a lace mechanism. Huber's mechanism employs a pair of spring loaded pivoted arms which have sets of sharp teeth that when pressed against the laces block their motion in both directions. Thus, Huber's mechanism is not a lace ratchet mechanism because it does not allow further lace tightening once it is. In its state, the laces are released in both directions simply by pressing the arms of Huber's mechanism. Huber's mechanism is impractical because the sharp teeth tend to cause a lot of lace wear when the laces are fastened before. Huber's mechanism structure is complex and expensive to manufacture. In addition, similar to the lace buckle, the user needs to fasten both laces with one hand while pressing the arms with the second hand to keep the mechanism in position. In U.S. Pat. No. 8,332,994 Jih-Liang Lin teaches a shoe lace fastener which fasten the lace using jagged arm on top and jagged base on bottom. The device structure includes many complex parts and is expensive to manufacture. Such a structure also is impractical because it will wear the lace very quickly. In U.S. Pat. No. 8,381,362 to Hammerslag et al. teaches Real based closure system. U.S. Pat. No. 8,332,994 to Lin teaches Shoelace with shoelace fastener. U.S. Pat. No. 8,141,273 to Stramare et al. describes Shoes with directional conditioning device for laces. U.S. Pat. No. 8,231,074 to Hu et al. describes Lace winding device for shoes. U.S. Pat. No. 8,230,560 to Luzlbauer teaches Fastening system for shoes.

U.S. Pat. No. 9,185,948 to Ben-Arie describes a Buckle Lace Fastening Device (BLFD) which also enables lace ratcheting. However, the BLFD is using resilient gates which do not rotate but bend. In addition, the mechanism of the BLFD, which is based on rotating the gripping wall is entirely different from the mechanism of the current invention.

U.S. Pat. No. 8,046,937 to Beers et al. describes an Automatic lacing system. U.S. Pat. No. 7,681,289 to Liu describes a Fastener for fasting together two lace systems. U.S. Pat. No. 7,591,050 to Hammerslag describes a Footwear lacing system. U.S. Pat. No. 7,320,161 to Taylor describes a Lace tying device. U.S. Pat. No. 7,313,849 to Liu describes a Fastener for lace. U.S. Pat. No. 7,152,285 to Liao describes a Shoe lace fastening device. U.S. Pat. No. 7,082,701 to Dalgaard describes Footwear variable tension lacing systems. U.S. Pat. No. 6,938,308 Funk describes a lace securing and adjusting device. U.S. Pat. No. 6,735,829 Hsu describes a U shaped lace buckle. In U.S. Pat. No. 6,588,079 to Manzano describes a Shoelace fastening assembly. U.S. Pat. No. 6,438,871 to Culverwell describes Footwear fastening. U.S. Pat. No. 6,192,559 to Munsell Jr. describes a Shoelace fastening apparatus. U.S. Pat. No. 6,094,787 to Chang describes a Fastening device. U.S. Pat. No. 5,572,777 to Shelton describes a Shoelace tightening device. U.S. Pat. No. 5,572,774 to Duren teaches a Shoe fastening attached device. U.S. Pat. No. 5,467,511 to Kubo describes a Shoelace fastening device. U.S. Pat. No. 5,335,401 to Hanson teaches a Shoelace tightening and device. U.S. Pat. No. 5,295,315 to Osawa et al. describes a Shoe fastening device and plate shaped member thereof. U.S. Pat. No. 5,293,675 to Shai describes a Fastener for shoelace. U.S. Pat. No. 5,293,669 to Sampson teaches a Multiuse fastener system. U.S. Pat. No. 5,230,171 to Cardaropoli teaches a Shoe fastener. U.S. Pat. No. 5,203,053 to Rudd teaches a Shoe fastening device. U.S. Pat. No. 5,177,882 to Berger teaches a Shoe with central fastener. U.S. Pat. No. 5,119,539 to Curry teaches a Lace fastener. U.S. Pat. No. 5,109,581 to Gould teaches a Device and method for securing a shoe. U.S. Pat. No. 4,991,273 to Huttle teaches Shoe lace fastening. U.S. Pat. No. 4,648,159 to Dougherty teaches a Fastener for lace or rope or the like. U.S. Pat. No. 4,616,432 to Bunch et al. teaches a Shoe upper with lateral fastening arrangement. U.S. Pat. No. 4,507,878 to Semouha teaches a Fastener mechanism. U.S. Pat. No. 4,458,373 to Maslow teaches Laced shoe and method for tying shoelaces. U.S. Pat. No. 4,261,081 to Lott teaches a Shoelace tightener. U.S. Pat. No. 4,130,949 to Seidel teaches Fastening means for sports shoes. U.S. Pat. No. 4,125,918 to Baumann teaches a Fastener for lace shoes. U.S. Pat. No. 4,071,964 to Vogiatzis teaches a Footwear fastening system. U.S. Pat. No. 5,097,573 to Gimeno teaches Fastening Device for Lace Up Shoes. U.S. Pat. No. 5,001,847 to Waters teaches a Lace Fastener. U.S. Pat. No. 5,477,593 to Leick teaches a Lace Device. U.S. Pat. No. 6,282,817 to Curet teaches an Apparatus and Method for Lacing.

US Patent Applications

In US 2011/0094072 to Lin describes a Shoelace with Shoelace Fastener. In US 2010/0115744 to Fong describes a Lace Fastener. In US 2009/0172929 to Huang describes a Device for tying Shoe laces. In US 2008/025068 to Stramare describes a Shoe with Directional Conditioning Device for lace or the like. In US 2007/0169380 to Borsoi teaches a Device for B Flexible Strands. In US 2006/0213085 to Azam teaches an Article for Footware with Linkage Tightening Device. In US 2005/0005477 to Borsoi teaches a Lace B Device. In US 2003/0226284 to Grande teaches a Lacing System For Skates. In US 2002/0002781 to Bourier teaches a Lace Tightening Device Having a Pocket for Storing a B Element.

BRIEF SUMMARY OF THE INVENTION

The target of the invention of the Belt Ratcheting Device (BRD) is to achieve the following goals:
1. A major goal of the invention is to configure a BRD that enables users to fasten by ratcheting any of a large variety of unmarked belts made of leather, cloth, plastics or other elastic materials without employing a discrete ratcheting mechanism.
2. A second target of the invention is to develop a BRD that enables the user to achieve an accurate level of fastening i.e. the user has just to pull the belt to the desired level of fastening and the belt remains fastened at the desired level after the pulling ceases. This entails that the BRD has to be configured to have a slip less, continuous ratcheting mechanism.
3. A third objective of the invention is to design a BRD with a linear ratcheting mechanism which does not require toothed or other discrete markings on the belt for its operation.
4. A fourth goal of the invention is to design a BRD with a linear ratcheting mechanism which causes minimal belt wear.
5. A fifth target of the invention is to design a BRD with a releasing mechanism which is quick and easy to operate.
6. A sixth objective of the invention is to design a BRD with a ratcheting mechanism structure, which is suited for low cost manufacturing.
7. A seventh objective of the invention is to configure a BRD which can be installed easily on footwear, garments or other objects with belts.

The specification describes an embodiment of the invention that is a belt ratcheting configuration which has a belt ratcheting mechanism which is designed for ratcheting different sizes of belts. This configuration also facilitate easy fastening and keeping fastened of: belts, laces, ropes, strings and alike. The basic Belt Ratcheting Device (BRD) has small size and thus can be installed on belts, bands, straps, ribbons, waist belts, suspenders, sandals, brassieres, watch bands, garment belts, and any sort of belts or bands connected to or wrapping of objects which need fastening. The BRD can be used to fasten a belt simply by inserting the belt into BRDs and pulling it. The BRD has a linear ratcheting mechanism with two states: "active" and "inactive". In the inactive state the ratcheting mechanism is disabled belt is free to move forwards and backwards. In the active state the device works as a linear belt ratchet i.e. allowing the belt to be pulled forwards but completely blocks or severely restricts any belt motion backwards. After the user has fastened the belt it remains fastened until the mechanism is switched into an inactive state. The BRD ratcheting mechanism is also a self-locking mechanism which applies on the belt a blocking pressure which is proportional to the backwards pulling force applied to the belt. This self-locking mechanism is adaptive and restricts backwards belt motion very efficiently because it generates a pressure force which results in a friction based belt blocking force which is proportional to the belt's backwards pulling force. So, the hardest the belt is pulled backwards the strongest is the blocking force which prevents it from moving backwards.

The BRD has a channel for fastening one belt. In the embodiment of the BRD, the channel comprises of four walls: a gripping wall, a top wall opposite to the gripping wall, a lower side wall approximately normal to the gripping wall and an upper side wall opposite to the lower side wall. A turning gate (made of solid material) is rotatably installed on an axle at the channel. The axle is centered at the turning gate's axis of rotation. The turning gate comprises of a front end and a rear end wherein the axis of rotation is situated between the two ends. The front end is opposite the gripping wall and there is a gap between the front end and the gripping wall. Wherein the belt is passing through that gap. A releasing lever is operating on the turning gate's rear end. In the embodiment, a couple of preloaded helical torsion springs are mounted on the axle. In other embodiments one could use other kinds of springs. The springs are installed preloaded with biases which tend to turn the gate in backwards direction i.e. towards an active state in which the front end tends to minimize the gap. Thus, the regular state of the turning gate is in the active state and it is switched into inactive state only when the user applies manual pressure on the releasing lever, which exceeds the bias and turns the turning gate forwards, thus increasing the gap and releasing the pressure force the front end applies on the belt in the gap. The turning gate has a front end which has a tapered thickness i.e. the front end has a sharp edge. In addition to the sharp edge the front end has a smooth side. The belt passes through a gap between the sharp edge of the front end and the channel's gripping wall situated opposite to the front end of the turning gate. The gap width is controlled by the orientation of the turning gate. The gap is narrowed when the gate is turned backwards. The gap is widened when the gate is turned forwards.

When the ratcheting mechanism is in active state, the gap has been narrowed such that the front end applies a pressure force which is squeezing the belt in the channel with its tapered front end i.e. sharp edge. At this situation, the turning gate acts as a belt ratchet. It means that the turning gate allows forwards fastening motion of the belt but blocks or severely restricts any belt translation in backwards direction. In order to have a belt ratchet operation, the turning gate is installed in a forwards leaning diagonal orientation in the channel such that its front end is closer to the gripping wall than its axis of rotation. Also, in a forwards leaning diagonal state, the turning gate's front end is closer to the channel's exit than the turning gate's axis of rotation.

The ratchet operation of the gate stems from the forward leaning diagonal orientation of the turning gate, which allows forwards belt motion when the belt is pulled forwards. Pulling forwards the belt which is squeezed in the gap, drags the turning gate's front end forwards due to the friction force which naturally exists between the belt and the front end as a natural consequence of the pressure force applied by the front end on the belt. When the front end is dragged forwards also the turning gate turns forwards. Due to the forwards leaning diagonal orientation of the turning gate, when its front end is turned forwards it is moved forwards and it also moves laterally inwards i.e. away from the gripping wall, whereby increasing the width of the gap between the front end and its gripping wall which in turn results in diminished pressure force of the front end on the belt. Reduced pressure force on the belt results in reduced friction between the belt and the surface of the gripping wall and also reduced friction between the belt and the front end. This facilitates even easier forwards motion of the belt.

On the other hand, if the belt is pulled backwards it also drags the turning gate's front end backwards (i.e. turning backwards) since the front end applies a squeezing force on the belt, which results in a mutual friction force with the belt. Hence, when the front end moves backwards also the turning gate turns backwards as well. Due to the forwards leaning diagonal orientation of the gate, the motion backwards of the front end has also a lateral outwards motion component which moves the front end towards the gripping wall thus further narrowing the gap and further restricting backwards belt motion. Hence, in an active state the gate acts as a belt ratchet i.e. allows belt forwards motion but severely restricts belt's backwards motion. When the ratcheting mechanism is switched into inactive state by turning the gate forwards, the gap is widened more than the belt's width and the belt is entirely released because it can move freely forwards or backwards in the channel. The user can easily switch the ratcheting mechanism from active to inactive state simply by manually pressing on the releasing lever, which applies a manual pressure on the rear end of the turning gate. If the manual pressure is greater than the torsion springs' preloading biases, the gate turns forwards and increases the gap's width, thus inactivating the ratchet mechanism of the BRD. When the manual pressure ceases the preloaded torsion springs turn the gate backwards into an active state. The BRD can be manufactured at low cost because it has a simple structure with only few parts, which could be made of a variety of rigid materials including metals or plastics.

The BRD's structure is different from other belt fastening devices in few important aspects. Primarily, the BRD enables a belt ratcheting operation which causes only minimal wear of the belt since it employs in the channel a novel structure with a diagonally forwards leaning turning gate with a single tapered front end, i.e. single sharp edge (i.e. a blade) which has a smooth side (for certain applications, such as in controlling wide belts, the front end can be split into several blades if more efficient). When the belt is moved forwards, the tapered end i.e. sharp edge at the front end of the turning gate rotates forwards this also turns the smooth side of the tapered end to be approximately parallel with the belt and the belt is sliding on the smooth side of the tapered end—which does not wear the belt. To further reduce belt wear, we also configured a smooth surface to the gripping wall opposite to the front end as well. Also, when the BRD is in inactive state, the gate is in forwards rotation, which also widens the gap and reduces belt friction and wear while the belt is moved forwards. Since the belt is blocked from moving backwards, there is no belt wear in the backwards motion as well. In addition, the BRD's gripping wall is manufactured with a smooth surface to minimize belt wear when it moves in the gap as well. In contrast, other belt fastening devices employ serrated surfaces with sharp teeth structures which are designed to block belt movement in their blocked state. However, sharp teeth structures cause significant belt wear even when they are in their unblocked state since their teeth remain pointed at the belt and the belt still touches them as it moves even in a wider gap. In our BRD the sharp front end could be split into two or more separate blades which engage the belt simultaneously at different lateral locations.

The BRD has many advantages over previous devices primarily due to its efficient and easy fastening operation by a ratchet mechanism which requires the user just to pull the belt to the desired fastening level. Once the belt is pulled, it remains fastened until the ratcheting mechanism is switched from active state into inactive state whereby it disables the ratchet mechanism and releases the belt. Additional advantage over all the other belt ratchets is that its ratchet mechanism does not use belt imprinted toothed strips. Fastening belts with ratchet devices which have belt imprinted surfaces, which regularly have sharp teeth, as all other ratchet belt fasteners do, results in fast wear of the imprinted strips on the belts. As a consequence, the ratchet mechanisms of such devices malfunctions after short use. In contrast, the diagonal orientation of the tapered i.e. sharp edges at the front ends of the turning gates in the BRDs, cause very little belt wear because each tapered front end i.e. sharp edge has a smooth side on which the belt can slide when it is fastened. The BRD was worn and tested daily by the Applicant for more than a year on various belts without any noticeable belt wear.

BRIEF DESCRIPTION OF THE DRAWINGS

FIGS. 3 and 4 show two cross section views of the three parts of the BRD.

DETAILED DESCRIPTION OF THE DRAWINGS

Figure 1:
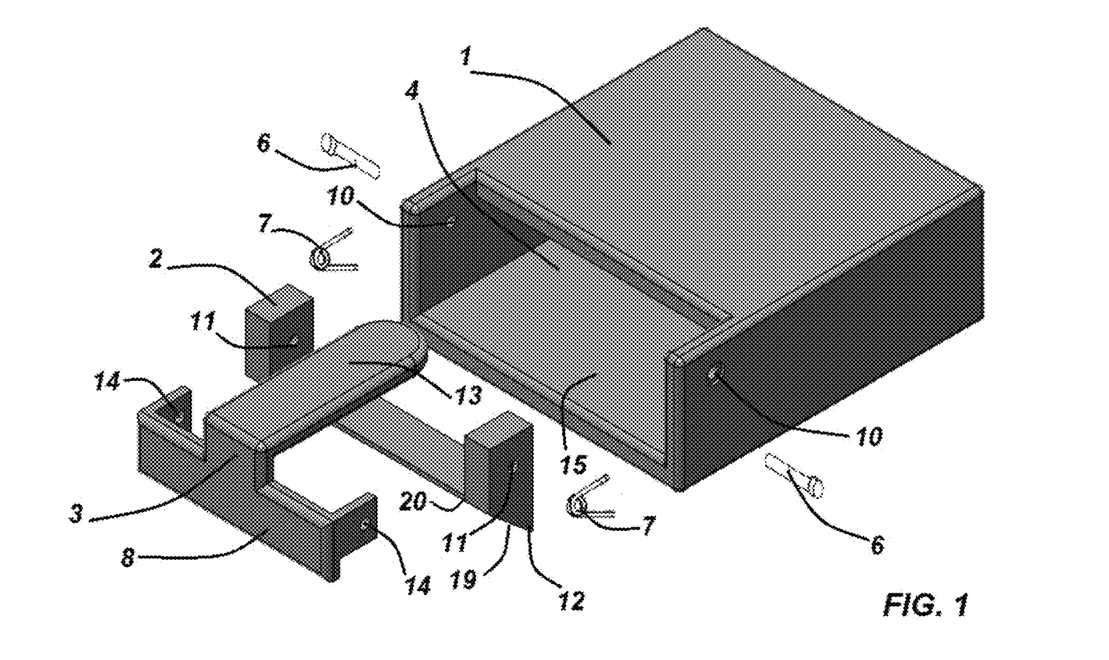
FIGS. 1 and 2 illustrate two views of 3D isometric drawings of an embodiment of a Belt Ratchet Device (BRD). The BRD in FIGS. 1 and 2 have 3 parts: a channel part, a turning gate part and a releasing lever part.
Figure 2:
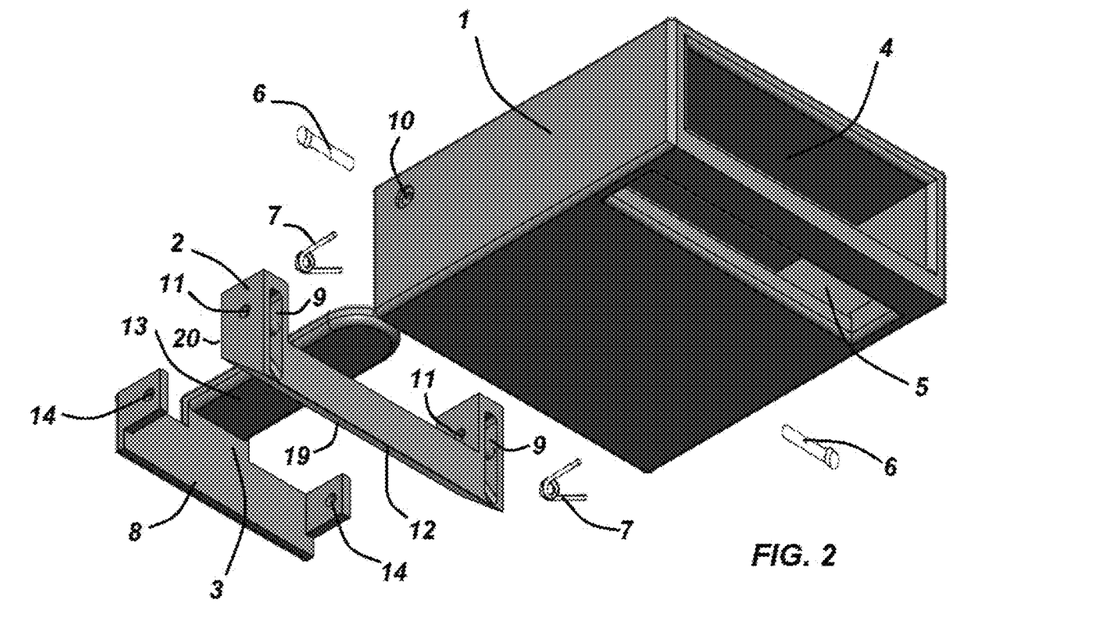
Figure 3:
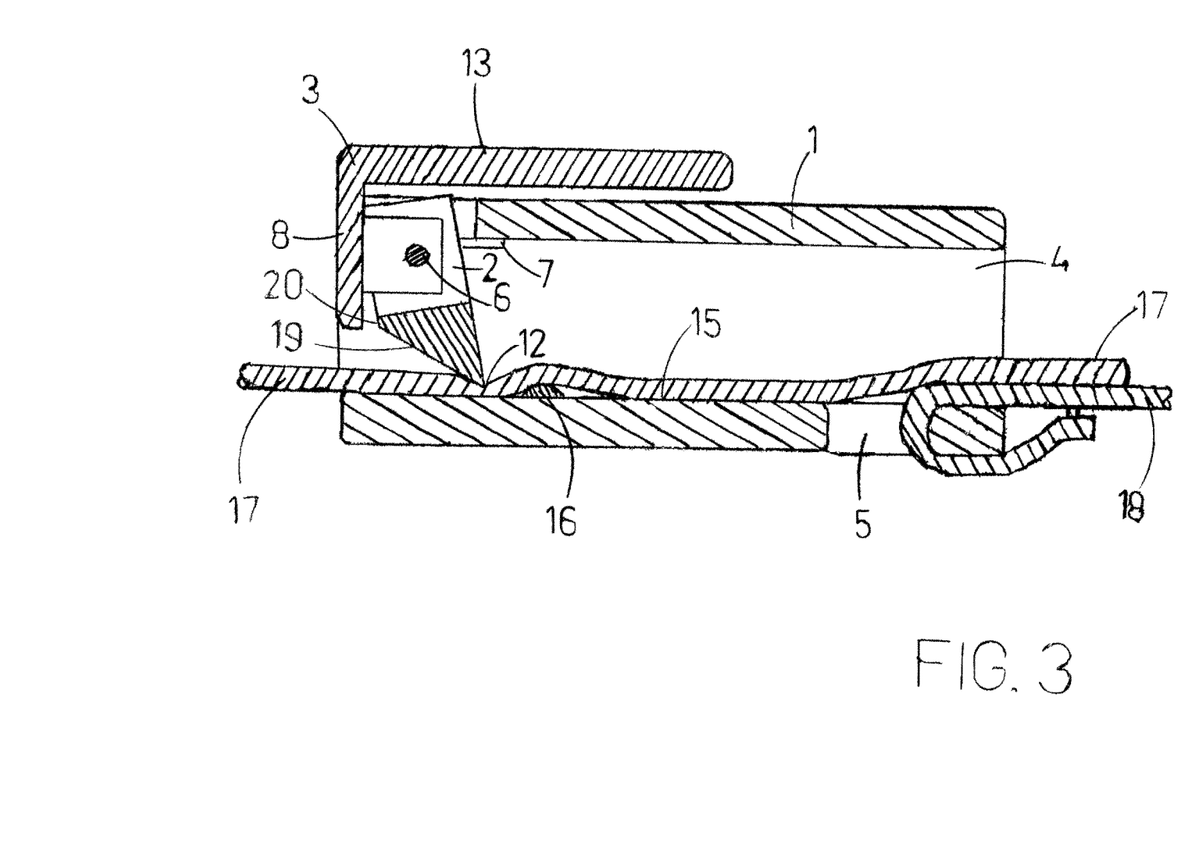
FIG. 3 illustrates a cross section of the BRD in active state.
Figure 4:
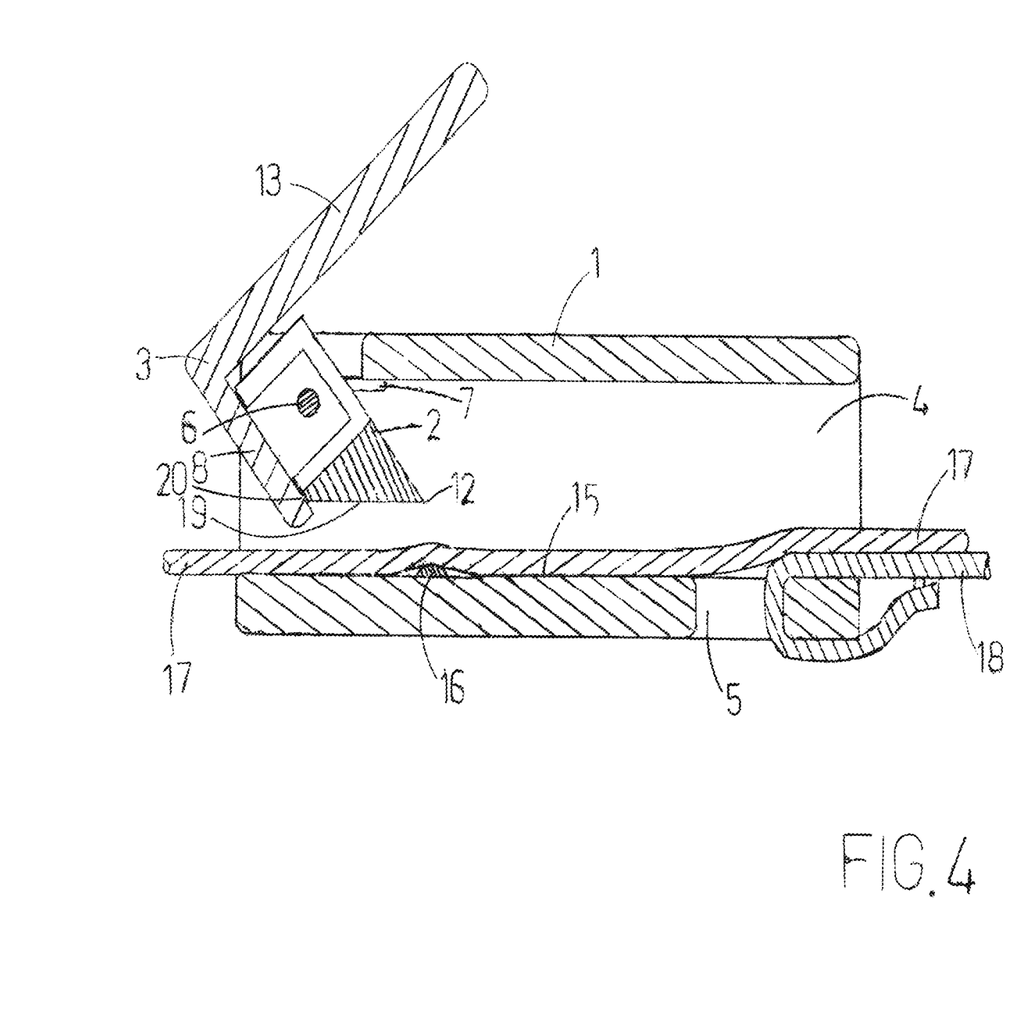
FIG. 4 illustrates a cross section of the BRD in inactive state.

FIGS. 1 and 2 illustrate 3D isometric drawings of the three parts of an embodiment the Belt Ratchet Device (BRD). FIGS. 1 and 2 show two 3D isometric views of the three parts of a disassembled BRD: the channel part 1, the turning gate part 2, and the releasing lever part 3. The channel part 1 of the BRD has a tunnel which is denoted by 4. The gripping wall 15 consists of the floor of the tunnel 4. The gripping wall 15 is gripping the belt (denoted by 17 for the belt's front part and as 18 for the Belt's rear part in FIGS. 3 and 4). In the active state of the BRD, the front part of the Belt 17 is squeezed in the gap between the gripping wall 15 and the front end 12 of the turning gate 2—as shown in FIG. 3. In FIG. 3 the BRD is in the active state in which the front end 12 of the turning gate 2 is squeezing the front part of the belt 17. In FIG. 4 the BRD is in the inactive state in which front end sharp edge 12 is not squeezing the belt 17. The Apertures pairs denoted by 10 (at the channel part 1), 11 (at the turning gate part 2) and 14 (at the releasing lever part 3) serve as bearings for the two axles 6 on which the turning gate 2 and the releasing lever 3 are turning on. The two spring cavities 9 on the left and right sides of the turning gate 2, house the two torsion springs 7 which are preloaded and their bias applies a backwards turning force (in clockwise direction in FIGS. 1,2,3) which presses on the turning gate 2 into its active state. The slot 5 is used for tying the rear part of the belt (shown as 18 in FIGS. 3 and 4) to the channel part 1. The releasing lever 3 is turning on its two bearings 14 on the two axles 6 (which also serve as axles for the turning gate 2). The releasing lever 3 is configured to turn the turning gate 2 forwards into the inactive state by pressing forwards (to the right in FIGS. 1,2,3,4) the gate's rear end 20 by the plate 8. This pressure turns the gate 2 in counterclockwise direction i.e. forwards direction in FIGS. 1,2,3,4. The releasing lever 3 is operated manually by pulling upwards the handle 13. This turns the releasing lever 3 in counterclockwise direction which moves forwards (to the right hand side in FIGS. 1,2,3,4) the plate 8 which in turn pushes forwards the gate's rear end 20 and turns forwards (counterclockwise) the gate 2 into the inactive state. Once the manual pulling of the handle 13 ceases, the springs' 7 biases turn the gate 2 backwards (in clockwise direction in FIGS. 1,2,3,4) into the active state. The sharp edge 12 in FIGS. 1,2,3,4 has a smooth side 19 which is engaging the belt at the active and inactive states when the belt is moved forwards. The smooth side 19 which is engaging the belt when the Belt is moved, along with the gripping wall 15 which is also smooth restrict the Belt's wear.

FIGS. 3 and 4 show two cross section views of the three parts of the BRD. FIG. 3 illustrates a cross section of the BRD in the active state. In the active state the BRD's ratchet mechanism is active, i.e. it allows only forwards belt motion and severely restricts Belt's backwards motion. FIG. 4 illustrates a cross section of the BRD in the inactive state in which the ratcheting mechanism of the BRD is inactive an the Belt is free to move both forwards and backwards directions. FIG. 3 shows the BRD in the active state in which the sharp edge 12 at the tip of the tapered front end of the turning gate 2 is squeezing the front part of the belt 17 against the gripping wall 15. The protrusion 16, which is attached to the gripping wall, is configured to increase the backwards restricting power of the gate 2 by bending the front part of the belt 17 and increasing the frictional force of the sharp edge 12 on the Belt. In FIG. 3 the turning gate 2 is in the active state, in which the gate 2 allows moving the belt forwards i.e. to the right in FIG. 3 but severely restricts the belt 17 backwards motion, i.e. leftwards. In FIG. 3 the BRD is in the active state of the ratcheting mechanism which facilitates only unidirectional movement of the belt (i.e. allowing belt motion to the right but severely restricting or entirely blocking the belt motion to the left).

FIGS. 3,4 illustrate cross sections of an assembled BRD which includes the channel part 1 the turning gate part 2 and the releasing lever part 3. The channel part 1 of the BRD has a tunnel which is denoted by 4. The gripping wall 15 of the tunnel 4 is gripping the belt (shown as 17 for the front part and as 18 for the Belt's rear part in FIGS. 3 and 4) by the sharp edge 12 at the tip of the front end of the turning gate 2 in FIGS. 3, 4. In FIG. 3 the sharp edge 12 at the tip of the front end of the turning gate 2 is squeezing the front part of the belt 17 against the gripping wall 15. The Apertures 10, 11 and 14 serve as a bearings for the two axles 6 on which the turning gate 2 and the releasing lever 3 are turning on. The two spring cavities 9 house the two torsion springs 7 which press on the turning gate 2 into its active state. The slot 5 is used for tying to the channel part 1 the rear part of the belt shown as 18. The releasing lever 8 is turning on its two bearings 14 on the two axles 6 (which also serve as axles for the turning gate 2 using bearings pair 11). The releasing lever 3 is configured to turn the turning gate 2 forwards into the inactive state by pressing forwards (i.e. to the right) the turning gate's rear end 20 by the plate 8. This pressure turns the turning gate 2 in counterclockwise direction i.e. forwards direction (also rightwards in FIGS. 1,2). The releasing lever 3 is manually operated by pulling upwards the handle 13. This turns the releasing lever 3 in counterclockwise direction which moves forwards (to the right) the plate 8 which in turn pushes forwards the turning gate's rear end 20 and turns forwards (in counterclockwise direction) the turning gate 2 into the inactive state. Once the manual pulling of the handle 13 ceases, the springs' 7 biases turn the gate 2 backwards (i.e. in clockwise direction) into the active state. FIG. 4 shows the BRD in inactive state in which the handle 13 was pulled upwards and the release lever is turned in counterclockwise direction while pushing forwards i.e. turning forwards (in counterclockwise direction) the gate's rear end 20 by the plate 8.

Figure 5:
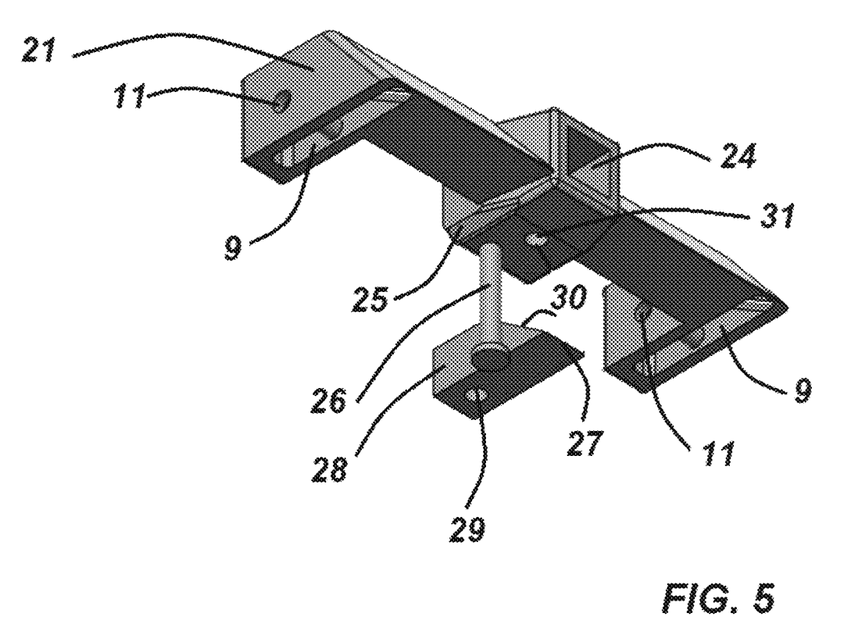
FIG. 5 illustrates a turning gate version 21 which replaces the tapered front end i.e. sharp edge 12 of the turning gate 2 with a replaceable blade 28 which could be made of wear resistant and hard material such as: metal or plastics.

FIG. 5 illustrates a turning gate version 21 which replaces the sharp edge 12 at the tip of the tapered front end of the turning gate 2 with a replaceable blade 28 which could be made of wear resistant and hard material such as metal or plastics. The replaceable blade 28 has a sharp edge 27 and a smooth side 30 and is housed in the housing structure 25 which has a blade's fitting cavity 24. The replaceable blade 28 is held in place by the pin 26 which is inserted into blade's aperture 29 trough aperture 27 in the blade's housing 25. The turning gate 21 turns on two bearings 11 and is retained by a pair of torsion springs 7 which are housed in spring cavities 9.

Figure 6:
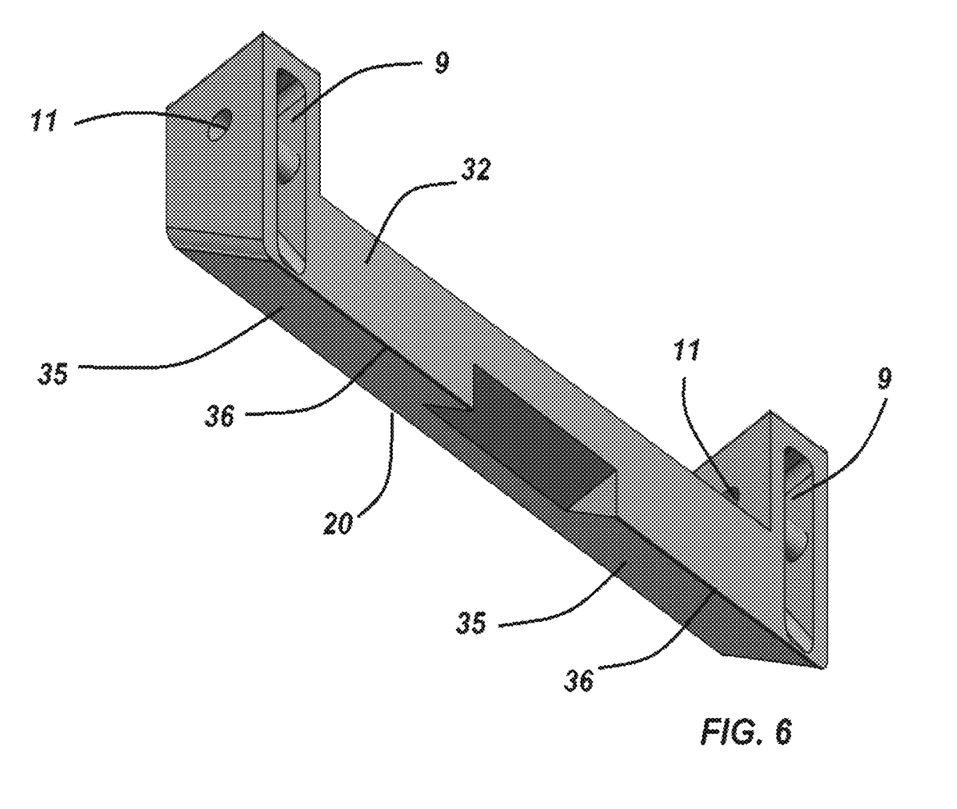
FIG. 6 shows a tuning gate version with split sharp edges.

FIG. 6 describes in 3D isometric drawing, a version of the turning gate 32 with two split sharp edges 36 each with a split smooth side 35. Both split sharp edges 36 are at the tip of the tapered front end of the turning gate 32. Similar to turning gate 2 in FIGS. 1,2,3,4 the turning gate 32 also turns on a pair of bearings 11 with two axles 6 and has two cavities 9 for housing two biased torsion springs 7 which tend to turn the turning gate 32 also into the active state. The rear side 20 of the split turning gate 32 is also illustrated in FIG. 6.

Figure 7:
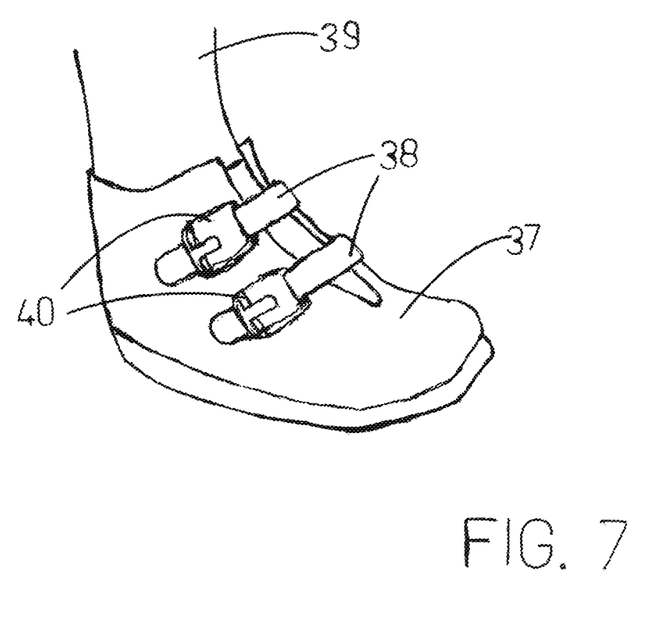
FIG. 7 depicts a footwear item with two BRDs which are fastening its belts.

FIG. 7 depicts a footwear item 37 on a leg 39 with two BRDs 40 which are fastening its belts 38.

What is claimed is:

1. A ratcheting device configured for releasably fastening a belt;
    wherein the ratcheting device comprising a channel and said belt;
    wherein the channel being configured to receive a portion of the belt therethrough;
        said channel further includes a gripping wall being adapted with a surface configured to engage said belt;
        the ratcheting device has an active state and an inactive state; wherein in said active state the ratcheting device is configured to restrict translation of the belt in the channel in a backwards direction and to facilitate translation of the belt in the channel in a forwards direction;
    wherein in said inactive state the ratcheting device is configured to facilitate translation of the belt both in said forwards direction and in said backwards direction;
    the ratcheting device further comprising:
    a turning gate, and
    a spring;
        the turning gate being rotationally engaged with the channel at a fulcrum, wherein the turning gate comprises a front end and a rear end opposite the front end;
        the turning gate is installed at a diagonal orientation with respect to the forwards direction; the front end is disposed diagonally opposite the gripping wall within the channel; wherein the belt is configured to pass through a gap between the front end and the gripping wall; wherein the front end is configured to exert a pressure force on the belt when the turning gate is turned backwards; wherein the front end is configured to exert the pressure force on the belt against the surface of the gripping wall;
        wherein, the front end is configured to increase the pressure force on the belt when the turning gate is turned increasingly backwards, and the front end is configured to reduce the pressure force on the belt when the turning gate is turned increasingly forwards;
        at the active state, the front end is configured to exert the pressure force on the belt and the front end is configured to frictionally engage the belt and to turn forwards the turning gate when the belt is translated in said forwards direction; also, at the active state the front end is configured to frictionally engage the belt and to turn backwards the turning gate when the belt is translated in said backwards direction;
        wherein, forwards translation of the belt is facilitated by turning increasingly forwards the turning gate and consequently diminishing the pressure force of the front end on the belt; whereas backwards translation of the belt is restricted by turning increasingly backwards the turning gate and consequently increasing the pressure force of the front end on the belt;
        at the inactive state of the ratcheting device, the front end is configured not to exert said pressure force on the belt and the belt translation is facilitated both in the forwards direction and in the backwards direction;
    the spring is preloaded and configured to apply a backwards turning force on the turning gate which is configured to apply said pressure force on the belt by the front end;
        the rear end is being configured as a lever for manually turning the turning gate forwards and diminishing the pressure force exerted by the front end on the belt;
        the rear end is being configured as a lever for manually turning the ratcheting device into the inactive state.

2. The ratcheting device of claim 1, wherein said fulcrum comprises an axle which is fitted into a bearing.

3. The ratcheting device of claim 1, wherein said spring is a torsion spring; the torsion spring has a helical wire structure made of a resilient wire with a first wire end and a second wire end; wherein said torsion spring is installed preloaded with a bias which is configured to apply said backwards turning force on the turning gate.

4. The ratcheting device of claim 1, wherein said front end is tapered and ends with a sharp edge, which has a smooth side;
    wherein, the sharp edge is configured to concentrate said pressure force on the belt when the turning gate is turned backwards while the front end engages the belt;
    wherein, the smooth side is configured to engage the belt when the turning gate is turned forwards;
    whereby, the smooth side is configured to restrict said belt wear when the belt is translated in the forwards direction.

5. The ratcheting device of claim 1, wherein the surface of the gripping wall comprises a smooth surface;
    wherein, the smooth surface is configured to restrict said belt wear when the belt is fastened at said active state and also when said belt is translated in said inactive state.

6. The ratcheting device of claim 1, wherein the ratcheting device further comprising one or more bulges disposed on the surface of the gripping wall; wherein said bulge is configured to cause an additional bending of the belt due to said pressure force;

wherein, said additional bending is configured to increase a mutual friction force between the belt and the surface of the gripping wall when said ratcheting device is in said active state and the belt is pulled in said backwards direction.

7. The ratcheting device of claim 3, wherein said ratcheting device further comprising a rear spring support; said rear spring support further comprising: a rear pin attached to said channel; wherein said first wire end is supported by said rear pin; wherein said second wire end is supported by said turning gate.

8. The ratcheting device of claim 3, wherein said ratcheting device further comprising a front spring support; wherein said first wire end is supported by said channel and said second wire end is supported by said turning gate.

9. The ratcheting device of claim 1, wherein said belt further comprises a first belt end and a second belt end; wherein said ratcheting device is configured for said belt fastening by tying said second belt end to said ratcheting device and fastening said first belt end with said ratcheting device; wherein, when the belt is fastened, said first belt end is configured to pull said ratcheting device in said forwards direction, while second belt end is configured to pull in said backwards direction the belt ratcheting device.

10. The ratcheting device of claim 4, wherein said sharp edge is split into at least two split sharp edges each with a split smooth side;

wherein, each of the split sharp edges is configured to concentrate said pressure force on the belt when the turning gate is turned backwards;

wherein, each of the split smooth sides is configured to engage the belt when the turning gate is turned forwards;

whereby, each of the split smooth sides is configured to restrict said belt wear when the belt is translated in the forwards direction.

11. The ratcheting device of claim 1, wherein at least one ratcheting device which is anchored to a footwear item, is configured to fasten said belt which is attached to the footwear item.

\* \* \* \* \*